(12) United States Patent
Passerell et al.

(10) Patent No.: US 7,270,087 B2
(45) Date of Patent: Sep. 18, 2007

(54) HEAT TRAP

(75) Inventors: David P. Passerell, Geneva, OH (US); Joseph C. Passerell, Geneva, OH (US); Michael C. Passerell, Ashtabula, OH (US); Steven J. Passerell, Rock Creek, OH (US); Jason D. Passerell, Madison, OH (US)

(73) Assignee: Bradford White Corporation, Ambler, PA (US)

( * ) Notice: Subject to any disclaimer, the term of this patent is extended or adjusted under 35 U.S.C. 154(b) by 0 days.

(21) Appl. No.: 10/940,109

(22) Filed: Sep. 14, 2004

(65) Prior Publication Data

US 2006/0054110 A1    Mar. 16, 2006

(51) Int. Cl.
F22B 5/04    (2006.01)

(52) U.S. Cl. .................... 122/14.31; 122/14.3

(58) Field of Classification Search ............. 122/14.31, 122/14.3; 126/361.1; 137/493, 539
See application file for complete search history.

(56) References Cited

U.S. PATENT DOCUMENTS

| | | | |
|---|---|---|---|
| 2,008,818 A | 11/1933 | Corbett | |
| 2,211,212 A | 8/1940 | Langdon | |
| 2,329,960 A | 9/1943 | Verheul | |
| 2,675,823 A | 4/1954 | Langdon | |
| 2,913,000 A | 11/1959 | Roberts | |
| 2,997,050 A | 8/1961 | Ferguson | |
| 3,010,441 A | 11/1961 | Torre | |
| 3,028,873 A | 4/1962 | Kindred | |
| 3,144,904 A * | 8/1964 | Kahn et al. | ................... 165/73 |
| 4,054,152 A | 10/1977 | Ito et al. | |
| 4,185,946 A | 1/1980 | Mitchell | |
| 4,246,932 A | 1/1981 | Raines | |
| 4,286,573 A | 9/1981 | Nickel | |
| 4,579,104 A * | 4/1986 | Snavely | ................... 122/14.31 |
| 4,633,853 A | 1/1987 | Prill et al. | |
| 4,729,401 A | 3/1988 | Raines | |
| 4,964,394 A | 10/1990 | Threatt | |
| 5,277,171 A * | 1/1994 | Lannes | ..................... 122/14.31 |
| 5,577,491 A * | 11/1996 | Lewis | ....................... 122/14.3 |
| 6,164,333 A | 12/2000 | Murphy et al. | |
| 6,269,780 B1 * | 8/2001 | Hughes | ....................... 122/14.3 |
| 6,532,906 B1 | 3/2003 | Knoeppel et al. | |
| 6,745,723 B1 * | 6/2004 | Hicks et al. | ............. 122/14.31 |
| 6,851,395 B2 * | 2/2005 | Knaus | ..................... 122/14.31 |
| 7,093,565 B2 * | 8/2006 | Robison | .................. 122/14.31 |

* cited by examiner

*Primary Examiner*—Gregory Wilson
(74) *Attorney, Agent, or Firm*—Ratner Prestia

(57) ABSTRACT

A heat trap assembly for providing a thermal dam within piping associated with water heaters is disclosed. The heat trap includes an elongated housing, a fin and a flap member. The housing includes first and second ends, and an interior opening extending therethrough to define an internal passage. The fin has a multi-sided body and is fixedly inserted into the housing. The flap member has a flexible disk-shaped body with first and second faces, an outer peripheral edge and an aperture disposed inward of the outer peripheral edge. A portion of the fin is inserted through the aperture. The outer peripheral edge is essentially contiguous with an interior wall surface of the housing in the absence of water flow within the internal passage, and is bendable in a direction of flow when water is flowing toward the first face or the second face.

37 Claims, 3 Drawing Sheets

HEAT TRAP

FIELD OF THE INVENTION

The present invention relates to a heat trap and more particularly to a heat trap having structure for preventing heat loss in the cold water inlet and hot water outlet piping of a hot water storage tank.

BACKGROUND OF THE INVENTION

Electric and gas water heaters are commonly used to provide a reserve of heated water for residential or commercial use. A typical water heater includes inlet piping for supplying cold water to a water tank and outlet piping for supplying heated water to one or more dispensing locations. In normal operation of the water heater, significant heat is lost through the inlet and outlet piping during stand-by periods when the tank is not being actively heated. This heat loss is primarily through thermal convection currents within the water. In other words, heat from the tank transfers in a vertical direction out of the tank within the inlet and outlet piping. Consequently, it is known in the art to use a heat trap assembly installed in the inlet and outlet piping above the tank as an energy saving device to reduce energy loss.

Typical heat trap designs are directed to damming the thermal convection currents. Several known designs have certain inherent flaws, including undesirable flow restriction, single direction installation capability, and limited longevity due to a propensity for corrosion of parts or subassemblies. Still other conventional heat traps include ball valves. Heat traps of this design create an undesirable rattling or clicking noise in operation as the ball contacts the internal pipe wall and/or the valve seat.

The present invention provides a new and improved heat trap assembly. The assembly provides a thermal barrier while permitting increased flow over prior art designs. The design is not flow directional specific, thereby increasing ease of installation by permitting installation in two directions. Moreover, the device can be installed in a horizontal or a vertical plane, or in any other orientation between horizontal and vertical. The materials used in the assembly are non-corrodible or corrosion resistant and thus do not decrease or otherwise limit the longevity of the device. The device also offers virtually silent operation. Another important feature is the device is self-regulating in regard to flow demand. Further, the present invention is highly adaptable to a variety of related applications. For example, the device may be inserted in field repairs by a technician, installed by a home owner as an after-market add-on device, or included in a water heater bill-of-material by an original equipment manufacturer.

SUMMARY OF THE INVENTION

In an illustrated embodiment of the invention, a heat trap assembly for providing a thermal dam within piping associated with water heaters is disclosed. The present invention simultaneously provides minimum flow restriction and is self-regulating to flow demand. The assembly is installable to permit bi-directional flow. Internal components such as a fin, flap member, housing and integral dielectric lining can be formed of various materials to meet certain environmental needs. Further, the present invention may be practiced in embodiments applicable for sale with water heaters by original equipment manufacturers, as modular units for use by service technicians, or as an after-market device installable by a home owner.

In one embodiment, a heat trap assembly for providing a thermal dam within a water pipe fitting having an interior wall surface is disclosed. The heat trap assembly includes a fin having a multi-sided body defining a plane and a flap member having a flexible disk-shaped body. The flap member includes a first face, a second face, an outer peripheral edge and an aperture disposed inward of the outer peripheral edge. A portion of the fin is inserted through the aperture. When the assembly is fixedly disposed within the fitting, the outer peripheral edge is essentially contiguous with the interior wall surface of the fitting when water is at rest within the fitting, and the flap member is bendable in a direction of water flow when water is flowing toward the first face or toward the second face.

The flap member may be constructed of Ethylene Propylene Diene Monomer (EPDM) and the fin may be constructed of a non-corrodible or corrosion resistant material.

The fin may include an outer peripheral edge defining two opposing slots adapted to secure the flap member in a position around the outer peripheral edge. The flap member may be secured in a position diagonally transverse to the fin.

The heat trap assembly may include a plurality of flap members.

In operation, the outer peripheral edge may be increasingly bent from the interior wall surface as flow in the fitting increases, and decreasingly bent as flow in the fitting decreases.

In a second embodiment, a heat trap assembly for providing a thermal dam for inlet and outlet piping associated with a water heater is disclosed. The assembly includes an elongated housing, a fin fixedly inserted into the housing, and a flap member. The housing includes a first end, a second end, and an interior opening extending therethrough to define an internal passage having an interior wall surface along a center axis. The first end and the second end include connections adapted for mating to the inlet or outlet piping.

The fin may be adapted to maintain laminar flow within the internal passage. The housing may be constructed of stainless steel. At least a portion of the internal wall surface may include a dielectric lining.

The assembly may be adapted to operate as a thermal dam and a flow regulator in all installation planes relative to horizontal.

In a third embodiment, a heat trap assembly for providing a thermal dam for a water pipe associated with a water heater, the water pipe including an interior pipe surface and having an interior pipe diameter, is disclosed. The assembly includes a ring member, a fin, and a flap member. The ring member includes a first portion having a first outer diameter, a second portion having a second outer diameter, a shoulder between the first portion and the second portion and an interior opening extending therethrough to define an internal passage having an interior wall surface along a center axis. The first outer diameter is larger than the second outer diameter.

The ring member may be a dielectric. The ring member may further include a plurality of radially extending linear ribs. The ribs may extend from an outer surface of the second portion. The ribs may be equally spaced about the outer surface of the second portion.

In a fourth embodiment, a heat trap assembly for providing a thermal dam for inlet and outlet piping associated with a water heater is disclosed. The assembly includes an elongated housing, a fin having a rectangular-shaped body and fixedly inserted into the housing, the fin being twisted along the center axis, a first flap member and a second flap member. Each flap member has a flexible disk-shaped body and includes a first face, a second face, an outer peripheral edge and an aperture disposed inward of the outer peripheral edge. A portion of the fin is inserted through the aperture. Each outer peripheral edge is essentially contiguous with the interior wall surface of the housing in the absence of water flow within the internal passage, and is bendable in a direction of water flow when water is flowing toward the front face or toward the rear face.

The twisted structure of the fin may induce turbulent flow within the internal passage.

Further features and advantages of the invention will become apparent from the following detailed description made with reference to the accompanying drawings.

DETAILED DESCRIPTION OF THE INVENTION

Figure 1:
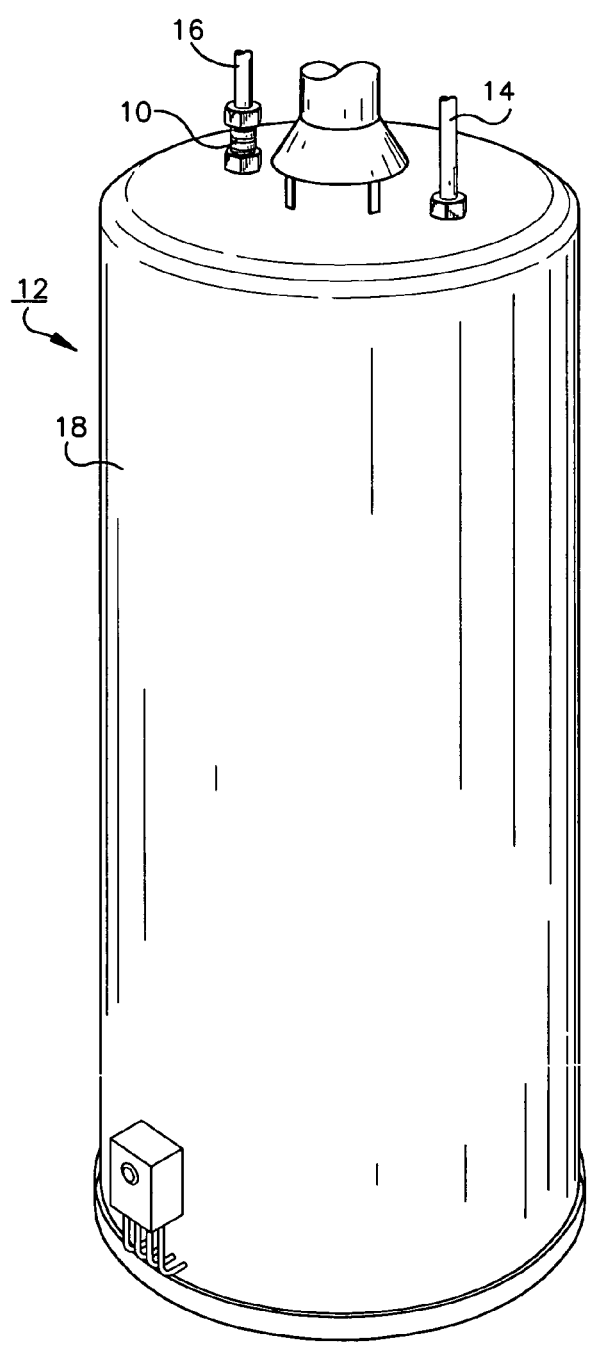
FIG. 1 is a perspective view of a water heater, showing a heat trap assembly installed within the hot water outlet piping.

Referring now to the drawings, a heat trap 10 of the present invention is shown in FIG. 1. As illustrated, FIG. 1 is a perspective view of a hot water heater 12, showing a heat trap assembly 10 installed within the outlet piping. The water heater 12 disclosed is conventional and provides a reserve of hot water for residential or commercial use. Cold water is introduced into a tank 18 for heating by gas, electric or other suitable energy source by a cold water line 14. As required, hot water is drawn out of a hot water line 16 to provide hot water to one or more dispensing locations. It should be understood that the illustration of this type of a hot water heater is for exemplary purposes only, and that the present invention may be practiced with any type of heated fluid reserve that losses energy by convection within supply lines.

Figure 2:
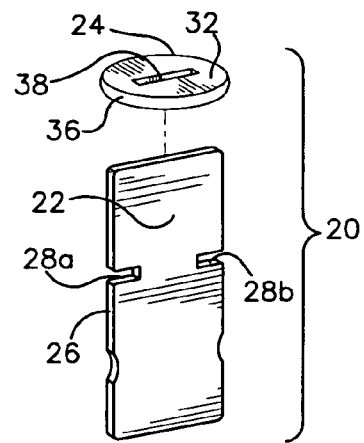
FIG. 2 is an exploded assembly view of a heat trap assembly made in accordance with one embodiment of the present invention.

An exploded assembly view of a heat trap assembly 20 made in accordance with a first embodiment of the present invention is illustrated in FIG. 2. The heat trap assembly 20 provides a thermal dam within a water pipe fitting having an interior wall surface. The assembly 20 includes a fin 22 and a flap member 24.

The fin 22 is polygon-shaped and more specifically, is rectangular shaped as shown. It should be understood by others with ordinary skill in the art that the fin can be multi-sided with rounded corners in the practice of the present invention. The fin is relatively thin to allow for water to pass along either side when the fin is installed within a pipe fitting. To prevent corrosion and extend the useable life of the heat trap assembly 20, the fin 22 is constructed of a non-corrodible or corrosion resistant material, such as polypropylene. Further, the selected material should be of sufficient strength and rigidity to maintain its shape during normal flow conditions.

Figure 3:
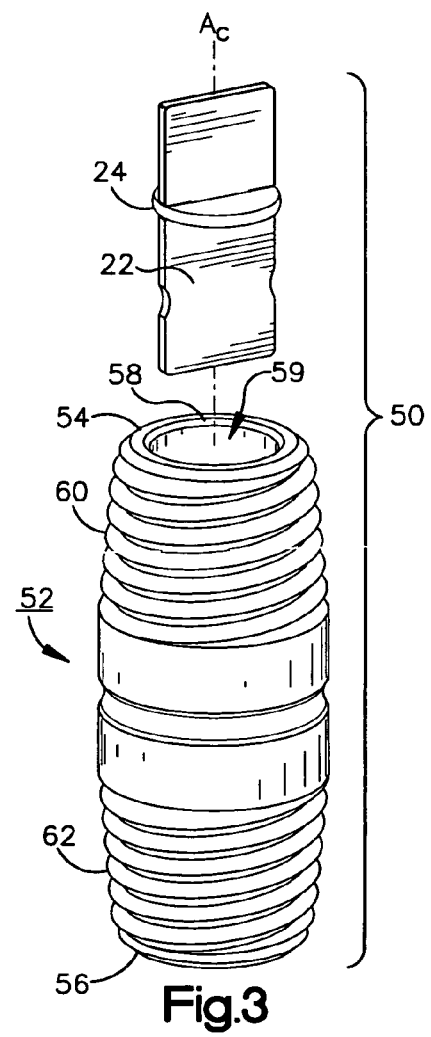
FIG. 3 is a partially exploded assembly view of an alterative embodiment of the present invention, showing a housing, a fin and flap member.
Figure 10:
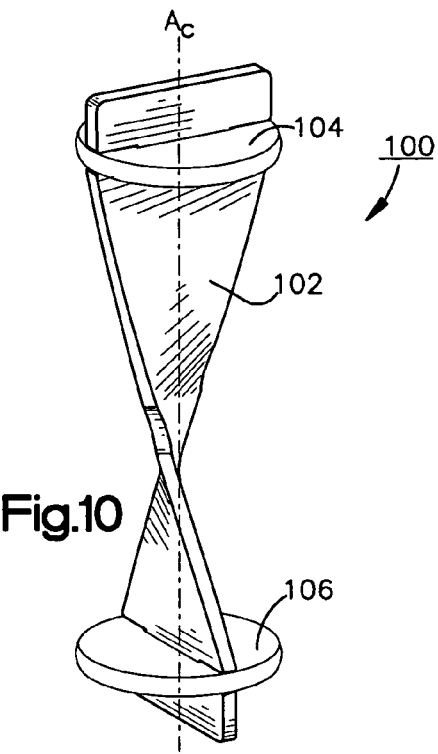
FIG. 10 is a perspective view of an alterative embodiment of the present invention, showing a twisted fin structure.

The fin 22 includes an outer peripheral edge 26 that defines two opposing slots 28a, 28b. The slots 28a, 28b are adapted to secure the flap member 24 in a position around the outer peripheral edge 26 of the fin 22. This secured arrangement is illustrated in FIG. 3. It should be apparent to others with ordinary skill in the art that in the practice of the present invention, a plurality of slot pairs may be included within an outer peripheral edge, permitting a plurality a flap members to be secured to the fin. An embodiment having a plurality of flap members is shown in FIG. 10.

Figure 6:
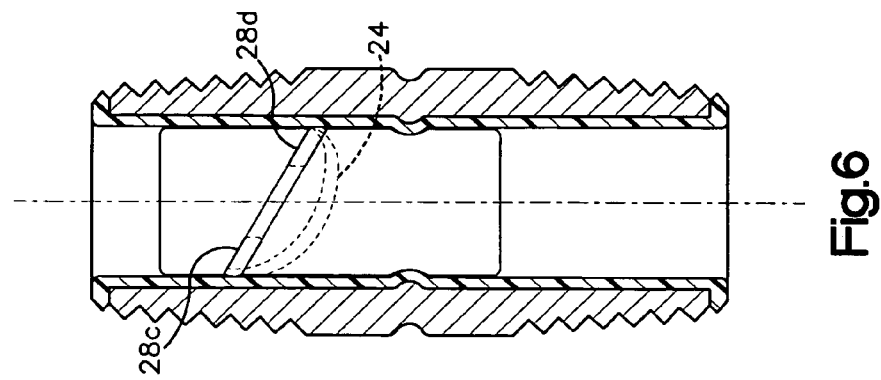
FIG. 6 is a side cross-sectional view of a yet another alterative embodiment of the present invention, showing the flap member secured at an alternative angle.

Referring to FIG. 3, the flap member is shown secured perpendicularly transverse to the fin. In other words, the flap member is perpendicular to laminar water flow within the fitting. Alternatively, the flap member may be secured diagonally transverse to the fin. An embodiment having this structure is shown in FIG. 6. In this arrangement, the front face exposed to water at rest has a greater surface area than the front face of the embodiment illustrated in FIG. 3. Although not wanting to be bound by theory, it is believed that this angled flap member arrangement produces increased energy savings performance.

The flap member 24 has a flexible disk-shaped body. As shown, the flap member includes a first face 32, a second face 34, and an outer peripheral edge 36. A rectangular-shaped aperture 38 is disposed inward of the outer peripheral edge 36. As assembled, a portion of the fin 22 is inserted through the aperture 38. The resulting assembled is shown in FIG. 3 as previously discussed. The flap member 24 may be constructed of EPDM or any other suitable elastomeric material that is bendable and inhibits convection when in contact with a supply of heated water at rest.

As discussed, the assembly acts as a thermal dam when installed within a pipe or fitting while in fluid communication with a heated water reserve. Specifically, when the assembly is fixedly disposed within such a fitting, the outer peripheral edge 36 is essentially contiguous with an interior wall surface of the fitting when water is at rest within the fitting. Further, the flap member 24 is bendable in a direction of water flow when water is flowing toward the first face 32 or toward the second face 34. This structure advantageously allows for installation in either of two directions at the option and convenience of the installer. In addition, the heat trap 20 is a self-regulating flow regulator. That is to say, as water is either drawn from or introduced into the water tank 18, the outer peripheral edge 36 is increasingly bent from the interior wall surface of a fitting toward the direction of water flow as flow in the fitting increases, and is decreasingly bent as flow in the fitting decreases. When water flow in the fitting essentially stops, the outer peripheral edge 36 returns to its original position essentially contiguous with the interior wall surface of the fitting.

Referring again to FIG. 3, a second embodiment of the present invention is shown. FIG. 3 is a partially exploded assembly view of a heat trap assembly 50 including a housing 52, a fin 22 and flap member 24. The assembly 50 is adapted to provide a thermal dam for inlet and outlet piping associated with a water heater.

As shown, the housing 52 is an elongated metallic tubular piece. The housing may be constructed of any suitable metallic or plastic non-corrodible or corrosion resistant material known in the art. The housing includes a first end 54 and a second end 56. From either end 54, 56, an interior opening 58 extends through the housing 52 to define an internal passage having an interior wall surface 59 along a center axis $A_c$. As discussed, the housing 52 may be installed such that water flows from the first end 54 to the second end 56, or alternatively, from the second end 56 to the first end 54. As shown, the first end and second end include threaded connections 60, 62 adapted for mating to the inlet or outlet piping of a water heater.

Figure 4:
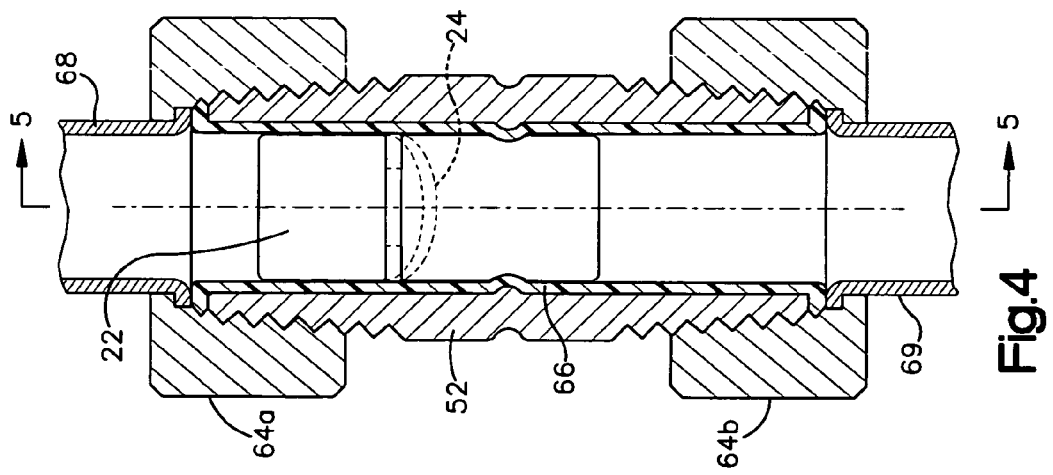
FIG. 4 is a side cross-sectional view of the heat trap assembly of FIG. 3 in an installed position, showing the flap member in a bent position during a period of water flow in the housing.

As in the first embodiment, the heat trap assembly 50 includes a fin 22 having a rectangular-shaped body. Referring now to FIG. 4, a side cross-sectional view of the heat trap assembly of FIG. 3 is shown in an installed position. Internally threaded nuts 64a, 64b mate with the threaded connections 60, 62 to seal the assembly 50 to an inlet pipe 68 and an outlet pipe 69. It should be understood by others with ordinary skill in the art that any conventional connection structure or piping material may be utilized in the practice of the present invention.

Another feature of the present design is that it is believed the elongated fin maintains laminar flow within the internal passage. Other prior art heat trap assemblies are believed to permit laminar flow to break down, or to allow turbulent flow within the assembly. It is believed that maintaining laminar flow allows for greater average flow velocity within the piping. In other words, the present invention does not create the detrimental effect of limiting flow.

The fin 22 is fixedly inserted into the housing 52. This insertion may be a separate assembly process. Alternatively, the fin 22 may be part of a unitized construction with a dielectric lining 66 included on at least a portion of the internal wall surface 59. The dielectric lining 66 of FIG. 4 covers the entire internal wall surface 59.

Figure 5:
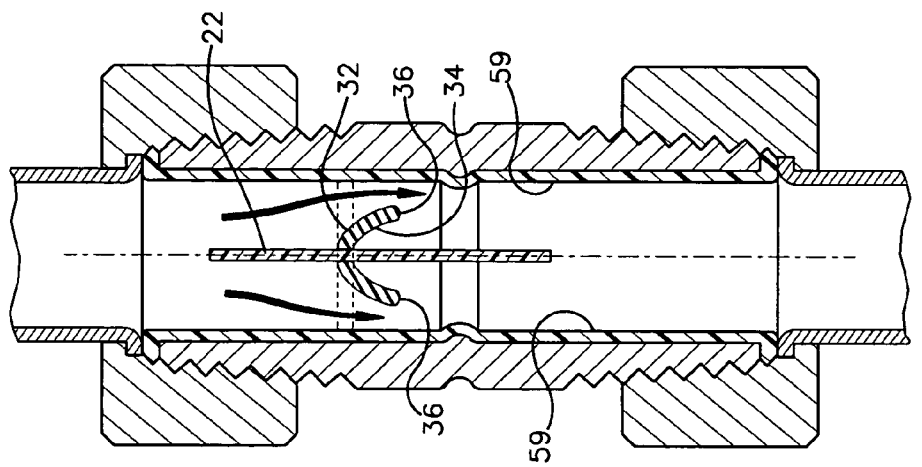
FIG. 5 is a side cross-sectional view of the heat trap assembly of FIG. 3, as seen approximately from a plane taken along the lines 5—5 of FIG. 4.

The second embodiment as illustrated also includes a disk-shaped flap member 24 constructed of bendable material. In FIG. 4, the flap member 24 is shown in a bent position during a period of water flow in the housing 52. The arrows in FIG. 5 indicate the direction of water flow from top to bottom. FIG. 5 is a side cross-sectional view of the heat trap assembly of FIG. 3, as seen approximately from a plane taken along the lines 5—5 of FIG. 4. In the bent position shown in FIGS. 4–5, water is flowing toward the first face 32 and away from the second face 34, causing the outer peripheral edge 36 to bend away from the interior wall surface 59 of the housing 52. As discussed, the heat trap is self-regulating. In other words, as flow increases through the fitting, the flap member will bend more so as to not undesirably restrict flow. As flow decreases, the flap member will bend less. In the absence of water flow within the internal passage, the flap will return to a position wherein the outer peripheral edge 36 is essentially contiguous with the interior wall surface 59. In this at rest position, the flap member is adapted to inhibit convection within the internal passage when water is at rest therein.

Another advantage of the present invention is the trap assembly shown in FIGS. 3–5 is adapted to operate as a thermal dam and a flow regulator in all installation planes relative to horizontal. The feature will accommodate any unusual piping configurations necessitated by limited space or structural barriers. Again, the installation options include water flow in two directions within the heat trap assembly.

Referring now to FIG. 6, a side cross-sectional view of a yet another alterative embodiment of the present invention is illustrated. The flap member 24 is secured at an alternative angle as compared to FIGS. 4–5. In this embodiment, the tin 22 includes an outer peripheral edge that defines two slots 28c, 28d. The slots are adapted to secure the flap member 24 in a position around the outer peripheral edge 26 such that the flap member is diagonally transverse to the fin 22. This arrangement requires the use of a flap member that has an increased front face surface area as compared to the flap member of FIGS. 3–5. More specifically, the flap member 24 is oval-shaped. As such, it is believed that the thermal dam performance of the flap member is improved.

Figure 7:
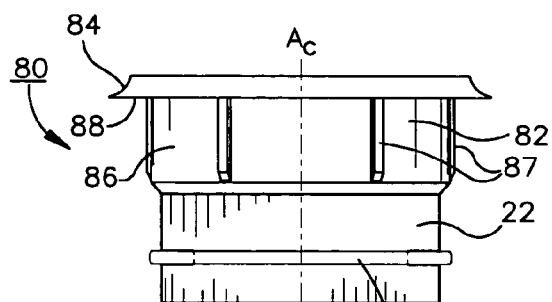
FIG. 7 is a side view of yet another alterative embodiment of the present invention, showing an insertable heat trap assembly having a ring member with integral friction ribs.

A fourth embodiment of the present invention is shown in FIG. 7. An insertable heat trap assembly 80 is illustrated. The assembly 80 includes a ring member 82, a fin 22 and a flap member 24. The fin 22 and flap member 24 are similarly sized and constructed as in the first and second embodiments.

The ring member 82 is sized to allow for insertion within an inlet or outlet pipe extending from or protruding into a water heater tank. A slight variation of this installation is discussed later in regard to FIG. 8. This modular embodiment is especially useful for after-market installation by a home-owner or as an accessory sold with a water heater by an original equipment manufacturer.

Figure 8:
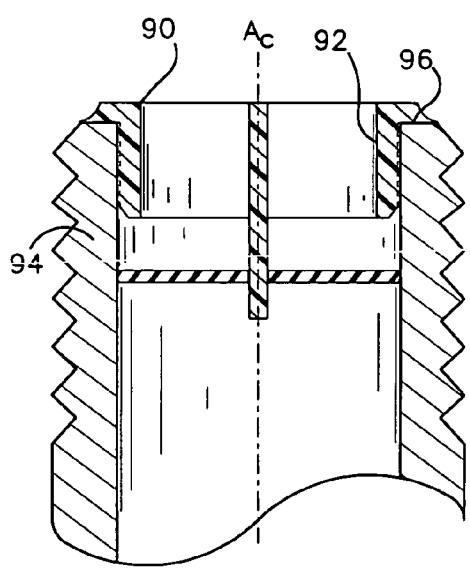
FIG. 8 is a side cross-sectional view of the heat trap assembly of FIG. 7 in an inserted position, showing the heat trap assembly inserted into a cold water inlet pipe to a water heater.

The ring member 82 includes a first portion 84 having a first outer diameter and a second portion 86 having a second outer diameter. The first outer diameter is larger than the second outer diameter. As illustrated in FIG. 7, a shoulder 88 exists between the first portion 84 and the second portion 86. As best seen in FIG. 8, an interior opening extends through the first portion 84 and the second portion 86 to define an internal passage 90 having an interior wall surface 92 circumferentially disposed along a center axis $A_c$.

As previously referenced, the flexibility of the assembly 80 for installation in a variety of OEM units is increased by a set of ribs 87. The ribs 87 provide friction in loose fitting pipes 94 and alternatively, the ribs are compressible to permit insertion into tight fitting pipes. As shown in FIG. 7, a plurality of ribs 87 are integral with the ring member 82. The ribs are linear in shape and radially extend from an outer surface of the second portion 86. The fin end of the ribs are beveled for ease of insertion into the pipe nipple 94. In the embodiment shown, six equally spaced ribs are integral with the ring member, although any suitable number and any suitable positioning may be used.

FIG. 8 is a side cross-sectional view of the heat trap assembly 80 of FIG. 7 in an inserted position, shown inserted into the cold water inlet pipe of a water heater. For exemplary purposes only, the heat trap is shown inserted into a steel inlet pipe 94. It should be apparent to others with ordinary skill in the art that the present invention may be practice in other suitable environments, including but not limited to, outlet piping, piping made by other metals or plastics, and dip tubes made from corrosion resistant plastic materials. Further, the inlet and outlet connections may be within the water heater itself, rather than external to the water heater.

To install such a heat trap assembly 80, an installer would begin by adequately drawing water from the tank and upstream piping. Once the piping was at zero pressure, the connection of the two hot and cold pipe nipples extending from the water tank must be broken from the descending copper or plastic pipe 95 (see FIG. 9). In older tanks, the extending nipple 94 is typically carbon steel. The end of the steel pipe nipple may have iron oxide, lime or other deposits. These should be removed as possible from the nipple. Next, a heat trap assembly 80 is placed in the steel pipe 94. When packaged in pairs, the heat trap assembly may be color code red for insertion into the outlet pipe and blue for insertion into the inlet pipe.

Figure 9:
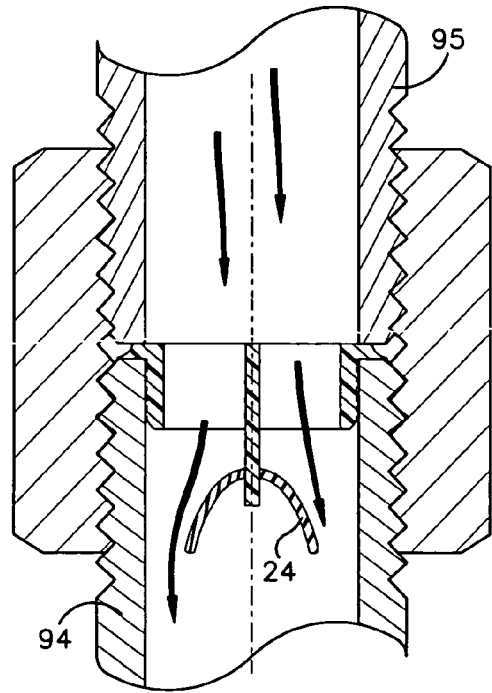
FIG. 9 is a side cross-sectional view of the heat trap assembly of FIG. 7 in an installed position, showing the flap member in a bent position during a period of water flow in water heater inlet pipe.

As see in FIG. 8, the shoulder 88 covers the top edge surface 96 of the steel pipe nipple 94. This structure acts to prevents corrosion. Further, the heat trap assembly 80 makes the assembly dielectric. Finally, the connection is re-established between the steel and copper or plastic piping by any suitable conventional method known in the art. As such, FIG. 9 is a side cross-sectional view of the heat trap assembly 80 of FIG. 7 in an installed position. The flap member 24 is illustrated in a bent position during a period of water flow in the inlet piping of the water heater.

FIG. 10 is a perspective view of an alterative embodiment of the present invention, showing a fin-flap assembly of a heat trap. The assembly 100 includes a twisted fin 102 and a first flap member 104 and a second flap member 106. As shown, the fin 102 has a rectangular-shaped body and is uniformly twisted along a center axis $A_c$. The first and second flap members 104, 106 are similarly constructed as in the first and second embodiments of the present invention. When assembled within a housing, the outer peripheral edges of each flap member 104, 106 are essentially contiguous with the interior wall surface of the housing in the absence of water flow within the internal passage of the housing. Further, the flap members 104, 106 are each bendable in a direction of water flow when water is flowing toward the front faces or toward the rear faces of the flap members 104, 106.

Although not wanted to be bound by theory, it is believed that this twisted fin structure acts to create a vortex water flow within the fitting. Further, this twisted fin structure may act to induce turbulent flow within the fitting if so desired.

Experiments have been conducted of several devices constructed in accordance with one embodiment of the present invention. Description and results of these experiments are described in the following section.

EXPERIMENTAL RESULTS AND DATA

An evaluation of a heat trap of the following description was conducted. The heat trap included ASTM A-53-94 type E or F grade A or B steel exterior pipe casing threaded in accordance with the requirements of ANSI B 1.20.1. The pipe was zinc electroplated with a clear chromate conversion coating. The interior lining of the heat trap was polypropylene in accordance with the requirements of NSF-61. The heat trap further included a flat blade constructed of polypropylene, as shown in the embodiment illustrated in FIGS. 3–6. An EPDM disk-shaped flap member was mounted on the blade to allow bi-directional water flow.

In the evaluation, the heat trap was installed in a test environment using well-accepted techniques pursuant to uniform plumbing practice. The heat trap was evaluated for pressure drop across the fitting, Energy Factor (EF) loss, longevity testing, and environmental cycle testing.

In flow conditions representative of normal use, a heat trap having a 2 inch long nipple measured an inlet pressure of 43.0 psi, an outlet pressure of 42.0 psi, and resultant delta pressure drop of 1.0 psi. A comparative 3 inch long nipple measured an inlet pressure of 41.0 psi, an outlet pressure of 37.5 psi, and resultant delta pressure drop of 3.5 psi.

It is well-accepted by those with ordinary skill in the art that the energy efficiency, or thermal dam properties, of a heat trap is measured by its Energy Factor (EF). In this experiment, the baseline EF of the water heater was 0.872, or the EF without a heat trap installed. With the 2 inch nipple neat trap of the present invention installed, the EF increased to 0.886. The delta between these two measurements, or the Insulation Effect, was 0.014.

The above-described heat trap was tested under two different cycle conditions. Using water in a standard longevity test, the heat trap having a 2 inch nipple functioned without fail for greater than 104,264 cycles. The cycle test involves increased flow and pressure conditions to replicate the intended life of a residential water heater. An environmental cycle test using a 5% chlorine solution was also performed. Again, the heat trap functioned without fail for greater than 104,264 cycles.

The above-described heat trap consistently achieved repeatable results within acceptable statistical ranges. It can be seen from these results to one with ordinary skill in the art, that a heat trap constructed in accordance with the present invention minimizes pressure drop across a fitting during flow conditions, provides an effective thermal damper during static conditions to reduce convective heat loss, and maintains functional results over a reasonable life cycle.

While several embodiments of the invention has been illustrated and described in considerable detail, the present invention is not to be considered limited to the precise constructions disclosed. Various adaptations, modifications and uses of the invention may occur to those skilled in the arts to which the invention relates. It is the intention to cover all such adaptations, modifications and uses falling within the scope or spirit of the claims filed herewith.

What is claimed is:

1. A heat trap assembly for providing a thermal dam within a water pipe fitting having an interior wall surface, said assembly comprising:
   a) a fin having a multi-sided body; and
   b) a flap member having a flexible disk-shaped body, said flap member comprising a first face, a second face, an outer peripheral edge and an aperture disposed inward of said outer peripheral edge, wherein a portion of said fin is inserted through said aperture;
   c) whereby when said assembly is fixedly disposed within said fitting, said outer peripheral edge is essentially contiguous with said interior wall surface of said fitting when water is at rest within said fitting, and said flap member is bendable in a direction of water flow when water is flowing toward said first face or toward said second face.

2. The heat trap assembly of claim 1 wherein said flap member is adapted to inhibit convection within said fitting when water is at rest therein.

3. The heat trap assembly of claim 1 wherein said flap member is constructed of an elastomeric material.

4. The heat trap assembly of claim 1 wherein said flap member is constructed of Ethylene Propylene Diene Monomer.

5. The heat trap assembly of claim 1 wherein said fin is constructed of a non-corrodible material.

6. The heat trap assembly of claim 1 wherein said fin comprises an outer peripheral edge defining two opposing slots adapted to secure said flap member in a position around said outer peripheral edge.

7. The heat trap assembly of claim 1 wherein said fin comprises an outer peripheral edge defining two slots adapted to secure said flap member in a position around said outer peripheral edge, wherein said flap member is diagonally transverse to said fin.

8. The heat trap assembly of claim 1 further comprising a plurality of flap members.

9. The heat trap assembly of claim 1 wherein said outer peripheral edge is increasingly bent from said interior wall surface as flow in said fitting increases, and is decreasingly bent as flow in said fitting decreases.

10. A heat trap assembly for providing a thermal dam for inlet and outlet piping associated with a water heater, said assembly comprising:
  a) an elongated housing comprising a first end, a second end, and an interior opening extending therethrough to define an internal passage having an interior wall surface along a center axis, wherein said first end and said second end comprise connections adapted for mating to said inlet or outlet piping;
  b) a fin having a polygon-shaped body and fixedly inserted into said housing; and
  c) a flap member having a flexible disk-shaped body, said flap member comprising a first face, a second face, an outer peripheral edge and an aperture disposed inward of said outer peripheral edge, wherein a portion of said fin is inserted through said aperture;
  d) wherein said outer peripheral edge is essentially contiguous with said interior wall surface of said housing in the absence of water flow within said internal passage, and is bendable in a direction of water flow when water is flowing toward said first face or said second face.

11. The heat trap assembly of claim 10 wherein said flap member is adapted to inhibit convection within said internal passage when water is at rest therein.

12. The heat trap assembly of claim 10 wherein said fin is adapted to maintain laminar flow within said internal passage.

13. The heat trap assembly of claim 10 wherein said housing is constructed of a metallic or plastic material.

14. The heat trap assembly of claim 10 wherein said assembly is adapted to operate as a thermal dam and a flow regulator in all installation planes relative to horizontal.

15. The heat trap assembly of claim 10 wherein said fin is constructed of a metallic or plastic material.

16. The heat trap assembly of claim 10 wherein at least a portion of said internal wall surface comprises a non-corrodible lining.

17. The heat trap assembly of claim 10 wherein said fin comprises an outer peripheral edge defining two opposing slots adapted to secure said flap member in a position around said outer peripheral edge of said fin.

18. The heat trap assembly of claim 10 wherein said fin comprises an outer peripheral edge defining two slots adapted to secure said flap member in a position around said outer peripheral edge, wherein said flap member is diagonally transverse to said fin.

19. The heat trap assembly of claim 10 wherein said outer peripheral edge is increasingly bent from said interior wall surface as flow in said fitting increases, and is decreasingly bent as flow in said fitting decreases.

20. A heat trap assembly for providing a thermal dam for a water pipe associated with a water heater, said water pipe comprising an interior pipe surface and having an interior pipe diameter, said assembly comprising:
  a) a ring member comprising a first portion having a first outer diameter, a second portion having a second outer diameter, a shoulder between said first portion and said second portion and an interior opening extending therethrough to define an internal passage having an interior wall surface along a center axis, said first outer diameter being larger than said second outer diameter;
  b) a fin having a polygon-shaped body and fixedly inserted into said ring member; and
  c) a flap member having a flexible disk-shaped body, said flap member comprising a first face, a second face, an outer peripheral edge and an aperture disposed inward of said outer peripheral edge, wherein a portion of said fin is inserted through said aperture;
  d) wherein said outer peripheral edge is essentially contiguous with said interior pipe surface in the absence of water flow within said pipe, and is bendable in a direction of water flow when water is flowing toward said first face or toward said second face.

21. The heat trap assembly of claim 20 wherein said fin is constructed of a non-corrodible material.

22. The heat trap assembly of claim 20 wherein said ring member is constructed of a non-corrodible material.

23. The heat trap assembly of claim 20 wherein said assembly is adapted to operate as a thermal dam and a flow regulator in all installation planes relative to horizontal.

24. The heat trap assembly of claim 20 wherein said fin comprises an outer peripheral edge defining two opposing slots adapted to secure said flap member in a position around said outer peripheral edge of said fin.

25. The heat trap assembly of claim 20 wherein said fin comprises an outer peripheral edge defining two slots adapted to secure said flap member in a position around said outer peripheral edge, wherein said flap member is diagonally transverses to said fin.

26. The heat trap assembly of claim 20 wherein said outer peripheral edge is increasingly bent from said interior wall surface as flow in said fitting increases, and is decreasingly bent as flow in said fitting decreases.

27. The heat trap assembly of claim 20 wherein said ring member further comprises a plurality of radially extending linear ribs.

28. The heat trap assembly of claim 20 wherein said ring member further comprises a plurality of ribs extending from an outer surface of said second portion.

29. A heat trap assembly for providing a thermal dam for inlet and outlet piping associated with a water heater, said assembly comprising:
  a) an elongated housing comprising a first end, a second end, and an interior opening extending therethrough to define an internal passage having an interior wall surface along a center axis, wherein said first end and said second end comprise connections adapted for mating to said inlet or outlet piping;
  b) a fin having a rectangular-shaped body and fixedly inserted into said housing, said fin being twisted along said center axis; and
  c) a first flap member and a second flap member, each flap member having a flexible disk-shaped body, said flap member comprising a first face, a second face, an outer peripheral edge and an aperture disposed inward of said outer peripheral edge, wherein a portion of said fin is inserted through said aperture;

d) wherein each said outer peripheral edge is essentially contiguous with said interior wall surface of said housing in the absence of water flow within said internal passage, and is bendable in a direction of water flow when water is flowing toward said front face or toward said rear face.

30. The heat trap assembly of claim 29 wherein at least a portion of said internal wall surface comprises a non-corrodible lining.

31. The heat trap assembly of claim 29 wherein said fin induces turbulent flow within said internal passage.

32. The heat trap assembly of claim 29 wherein said outer peripheral edge is increasingly bent from said interior wall surface as flow in said fitting increases, and is decreasingly bent as flow in said fitting decreases.

33. A heat trap assembly for providing a thermal dam for a water pipe associated with a water heater, said water pipe comprising an interior pipe surface and having an interior pipe diameter, said assembly comprising:
   a) a ring member constructed of a non-corrodible material comprising a first portion having a first outer diameter, a second portion having a second outer diameter, a shoulder between said first portion and said second portion and an interior opening extending therethrough to define an internal passage having an interior wall surface along a center axis, said first outer diameter being larger than said second outer diameter;
   b) a plurality of ribs extending from an outer surface of said second portion;
   c) a fin constructed of a non-corrodible material having a polygon-shaped body and fixedly inserted into said ring member; and
   d) a flap member having a flexible disk-shaped body, said flap member comprising a first face, a second face, an outer peripheral edge and an aperture disposed inward of said outer peripheral edge, wherein a portion of said fin is inserted through said aperture;
   e) wherein said outer peripheral edge is essentially contiguous with said interior pipe surface in the absence of water flow within said pipe, and is bendable in a direction of water flow when water is flowing toward said first face or toward said second face.

34. A heat trap configured to be used with a water heater having an inlet and an outlet, said heat trap comprising:

a ring member having
   a shoulder portion with an interior opening defining an internal passage, and
   a fin portion coupled to said shoulder portion and extending across said internal passage; and
a disk-shaped flap member engaged to said fin portion of said ring member, said flap member defining an aperture sized to receive at least a portion of said fin portion of said ring member and having an outer peripheral edge;
whereby when said heat trap is used with the inlet or the outlet of the water heater, said outer peripheral edge of said flap member is essentially contiguous with the inlet or the outlet when water is at rest within the inlet or the outlet, and said flap member is bendable in a direction of water flow when water is flowing through the inlet or the outlet.

35. A method of fabricating the heat trap recited in claim 34, said method comprising the steps of:
   extending a portion of the fin portion of the ring member through the aperture defined in the flap member; and
   engaging the flap member to the fin portion of the ring member such that the flap member is bendable.

36. A method of fabricating the heat trap recited in claim 34 with a water heater having an inlet and an outlet, said method comprising the steps of:
   coupling the shoulder portion of the ring member of the heat trap to the inlet or the outlet of the water heater; and
   positioning the outer peripheral edge of the flap member to be essentially contiguous with the inlet or the outlet of the water heater.

37. A water heater comprising:
   a water tank having an inlet and an outlet; and
   the heat trap recited in claim 34, said shoulder portion of said ring member of said heat trap being coupled to the inlet or the outlet of the water tank, and said outer peripheral edge of said flap member of said heat trap being essentially contiguous with the inlet or the outlet of the water tank.

* * * * *